US012793655B2

(12) United States Patent
Kim et al.

(10) Patent No.: US 12,793,655 B2
(45) Date of Patent: Nov. 10, 2026

(54) DISPLAY DEVICE

(71) Applicant: SAMSUNG DISPLAY CO., LTD., Yongin-si (KR)

(72) Inventors: Ji Hyun Kim, Yongin-si (KR); Jin Young Jeon, Yongin-si (KR); Yun Ki Bae, Yongin-si (KR); Jong Young Yun, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 18/967,997

(22) Filed: Dec. 4, 2024

(65) Prior Publication Data

US 2025/0225943 A1 Jul. 10, 2025

(30) Foreign Application Priority Data

Jan. 5, 2024 (KR) ........................ 10-2024-0002012
Jun. 3, 2024 (KR) ........................ 10-2024-0072436

(51) Int. Cl.
*G09G 5/00* (2006.01)
*G09G 3/32* (2016.01)
*G09G 3/3266* (2016.01)
*G09G 3/3291* (2016.01)

(52) U.S. Cl.
CPC ............. *G09G 3/3291* (2013.01); *G09G 3/32* (2013.01); *G09G 3/3266* (2013.01); *G09G 2310/0267* (2013.01); *G09G 2310/0275* (2013.01); *G09G 2310/08* (2013.01); *G09G 2330/021* (2013.01); *G09G 2360/12* (2013.01); *G09G 2380/02* (2013.01)

(58) Field of Classification Search
CPC ...... G09G 3/3291; G09G 3/32; G09G 3/3266; G09G 2310/0267; G09G 2310/0275; G09G 2310/08; G09G 2330/021; G09G 2360/12; G09G 2380/02; G09G 3/3233; G09G 3/3644; G09G 3/035; G09G 3/20; G09G 3/3666; H10K 59/88; H10K 59/121; H10K 59/131; G02F 1/1345
USPC ............................ 345/1.3, 213, 1.1; 349/149
See application file for complete search history.

(56) References Cited

U.S. PATENT DOCUMENTS

| | | | | |
|---|---|---|---|---|
| 9,886,063 | B2 | 2/2018 | Yoo et al. | |
| 11,176,879 | B2 | 11/2021 | Cho | |
| 11,983,038 | B2 | 5/2024 | Kim et al. | |
| 2005/0030254 | A1* | 2/2005 | Jung .................... | G09G 3/3666 345/1.1 |
| 2006/0001819 | A1* | 1/2006 | Maeng .................. | G02F 1/1345 349/149 |

(Continued)

FOREIGN PATENT DOCUMENTS

| | | |
|---|---|---|
| KR | 10-2021-0013800 | 2/2021 |
| KR | 10-2387786 | 4/2022 |

(Continued)

*Primary Examiner* — Abdul-Samad A Adediran
(74) *Attorney, Agent, or Firm* — F. CHAU & ASSOCIATES, LLC

(57) ABSTRACT

A display device includes a first display panel that displays an image in one direction in a first mode and includes a first pixel, a second display panel that displays the image in a direction opposite to the one direction in the first mode and includes a second pixel, and a driving circuit that provides a data voltage to a data line connected to the first pixel and the second pixel.

20 Claims, 10 Drawing Sheets

(56) References Cited

U.S. PATENT DOCUMENTS

| | | | | |
|---|---|---|---|---|
| 2006/0256103 | A1* | 11/2006 | Hong | G09G 3/3644<br>345/213 |
| 2014/0118221 | A1* | 5/2014 | Park | G09G 3/20<br>345/1.3 |
| 2017/0117342 | A1* | 4/2017 | Kwon | H10K 59/131 |
| 2021/0407430 | A1* | 12/2021 | Seo | G09G 3/3233 |
| 2022/0068195 | A1* | 3/2022 | Yun | G09G 3/32 |
| 2022/0077275 | A1* | 3/2022 | Jo | G09G 3/035 |
| 2023/0309248 | A1* | 9/2023 | Choi | H10K 59/121 |
| 2023/0389368 | A1* | 11/2023 | Kang | H10K 59/88 |

FOREIGN PATENT DOCUMENTS

| | | |
|---|---|---|
| KR | 10-2538955 | 5/2023 |
| KR | 10-2582968 | 9/2023 |
| WO | 2017150901 | 8/2017 |

* cited by examiner

FIG. 7

| MS | M1_OPT | M2_OPT | | |
|---|---|---|---|---|
| 0 (M1) | 0 | - | DP1 | SIMULTANEOUS DRIVING |
| | 1 | | DP2 | |
| 1 (M2) | - | 0 | DP1 | INDIVIDUAL DRIVING |
| | | 1 | DP2 | |

DISPLAY DEVICE

CROSS-REFERENCE TO RELATED APPLICATIONS

This application claims priority under 35 U.S.C. § 119 to Korean Patent Application No. 10-2024-0002012 filed on Jan. 5, 2024, and Korean Patent Application No. 10-2024-0072436 filed on Jun. 3, 2024, the disclosures of which are incorporated by reference herein in their entireties.

TECHNICAL FIELD

The present disclosure relates to a display device.

DISCUSSION OF RELATED ART

As information technology has advanced, the importance of display devices, which serve as the interface between users and information, has become more prominent. As a result, the use of display devices such as, for example, liquid crystal display (LCD) devices, organic light-emitting diode (OLED) display devices, and light-emitting diode (LED) display devices is increasing.

The display device displays an image. There is a growing trend toward display devices with larger screens, yet maintaining the same or smaller size and thickness compared to previous designs. Additionally, flexible display devices, such as foldable and bendable screens, are being developed. These devices can fold and unfold to provide a larger screen only when needed.

SUMMARY

An object of the present disclosure provides a display device that may drive a first display panel and a second display panel using one driving circuit.

According to an embodiment of the present disclosure, a display device includes a first display panel that displays an image in one direction in a first mode and includes a first pixel, a second display panel that displays the image in a direction opposite to the one direction in the first mode and includes a second pixel, and a driving circuit that provides a data voltage to a data line connected to the first pixel and the second pixel.

In an embodiment, the first display panel includes a main area that displays the image and a sub-area in which the driving circuit is disposed.

In an embodiment, a first portion of the main area and a second portion different from the first portion of the main area are configured to be folded and face each other in a second mode.

In an embodiment, the second display panel includes a main area that displays the image and a sub-area connecting the main area and the first display panel, and the data line is disposed in the sub-area.

In an embodiment, the sub-area is bendable.

In an embodiment, a second display area of the second display panel, in which the image is displayed, is smaller than a first display area of the first display panel, in which the image is displayed.

In an embodiment, a length of the second display area in a first direction is shorter than a length of the first display area in the first direction, and a length of the second display area in a second direction perpendicular to the first direction is about equal to a length of the first display area in the second direction.

In an embodiment, the driving circuit simultaneously display the image on the first display panel and the second display panel.

In an embodiment, the driving circuit refreshes the first display panel at a first driving frequency and refreshes the second display panel at a second driving frequency.

In an embodiment, a frame in which the first display panel is refreshed and a frame in which the second display panel is refreshed are different.

In an embodiment, the driving circuit displays the image on one of the first display panel and the second display panel.

In an embodiment, the driving circuit simultaneously displays the image on the first display panel and the second display panel in the first mode, and displays the image on one of the first display panel and the second display panel in a second mode.

In an embodiment, the driving circuit provides the data voltage for one of the first display panel and the second display panel to the data line in one frame.

In an embodiment, a resolution of the first display panel is higher than a resolution of the second display panel.

In an embodiment, the driving circuit includes a frame memory that stores one frame of input image data, and a capacity of the frame memory has a value corresponding to the resolution of the first display panel.

According to an embodiment of the present disclosure, a display device includes a first display panel including a first pixel, a second display panel including a second pixel, a first gate driver that provides a gate signal to a first gate line connected to the first pixel, a second gate driver that provides the gate signal to a second gate line connected to the second pixel, and a driving circuit that provides a data voltage to a data line connected to the first pixel and the second pixel and controls the first gate driver and the second gate driver.

In an embodiment, the first display panel includes a main area that displays an image and a sub-area in which the driving circuit is disposed.

In an embodiment, the second display panel includes a main area that displays an image and a sub-area connecting the main area and the first display panel, and the data line is disposed in the sub-area.

In an embodiment, the driving circuit simultaneously displays an image on the first display panel and the second display panel.

In an embodiment, the driving circuit displays an image on one of the first display panel and the second display panel.

BRIEF DESCRIPTION OF THE DRAWINGS

The above and other features of the present disclosure will become more apparent by describing in detail embodiments thereof with reference to the accompanying drawings.

FIG. 7 illustrates a table related to an example in which the display device of FIG. 1 drives a display panel.

DETAILED DESCRIPTION OF AN EMBODIMENTS

Figure 1:
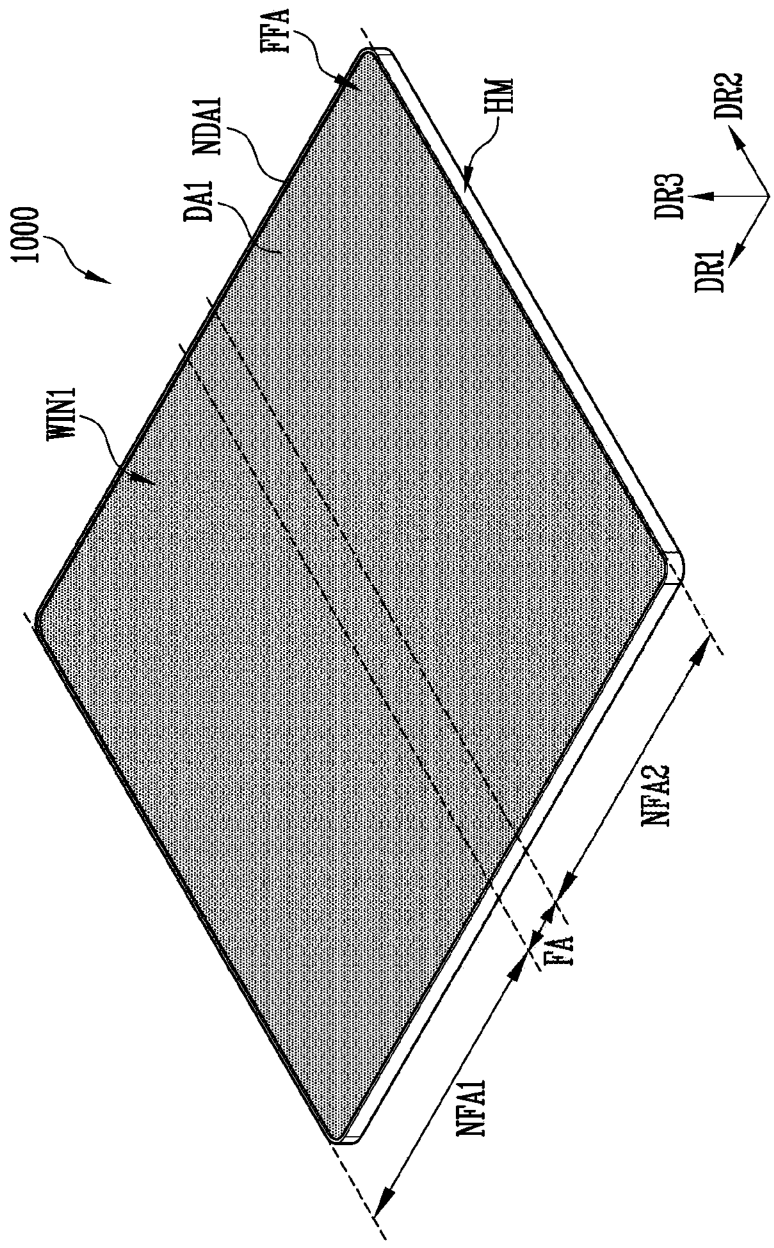
FIG. 1 illustrates a normal mode of a display device according to embodiments of the present disclosure.

Embodiments of the present disclosure will be described more fully hereinafter with reference to the accompanying drawings. Like reference numerals may refer to like elements throughout the accompanying drawings.

It will be understood that when an element is referred to as being "on", "connected to", "coupled to", or "adjacent to" another element, it can be directly on, connected, coupled, or adjacent to the other element, or intervening elements may be present. It will also be understood that when an element is referred to as being "between" two elements, it can be the only element between the two elements, or one or more intervening elements may also be present. It will also be understood that when an element is referred to as "covering" another element, it can be the only element covering the other element, or one or more intervening elements may also be covering the other element. Other words used to describe the relationships between elements should be interpreted in a like fashion.

For the purposes of this disclosure, "at least one of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various constituent elements, these constituent elements should not be limited by these terms. These terms are used to distinguish one constituent element from another. Thus, a first constituent element discussed below could be termed a second constituent element without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or at other orientations), and, as such, the spatially relative descriptors used herein interpreted accordingly.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

Herein, when two or more processes or events are described as being performed simultaneously, it is to be understood that the processes or events may be performed at or may occur at exactly the same time, or at about the same time as would be understood by a person having ordinary skill in the art. For example, the processes or events may be performed at or may occur at about the same time within a measurement error as would be understood by a person having ordinary skill in the art.

Embodiments of the present disclosure provide a display device that incorporates both a first and second display panel, capable of displaying images in opposite directions, all driven by a single driving chip. This configuration reduces the number of required driving chips, which may result in lower production costs, a smaller device size, and reduced power consumption. The device's flexible folding and bending features enable different use modes where the display can fold and unfold. The single driving chip may efficiently operate both display panels either simultaneously or individually, depending on the mode, supplying data voltage and control signals, refreshing them at different frequencies, and supporting various configurations. Thus, embodiments of the present disclosure provide a more compact, versatile, and cost-effective display device.

Figure 2:
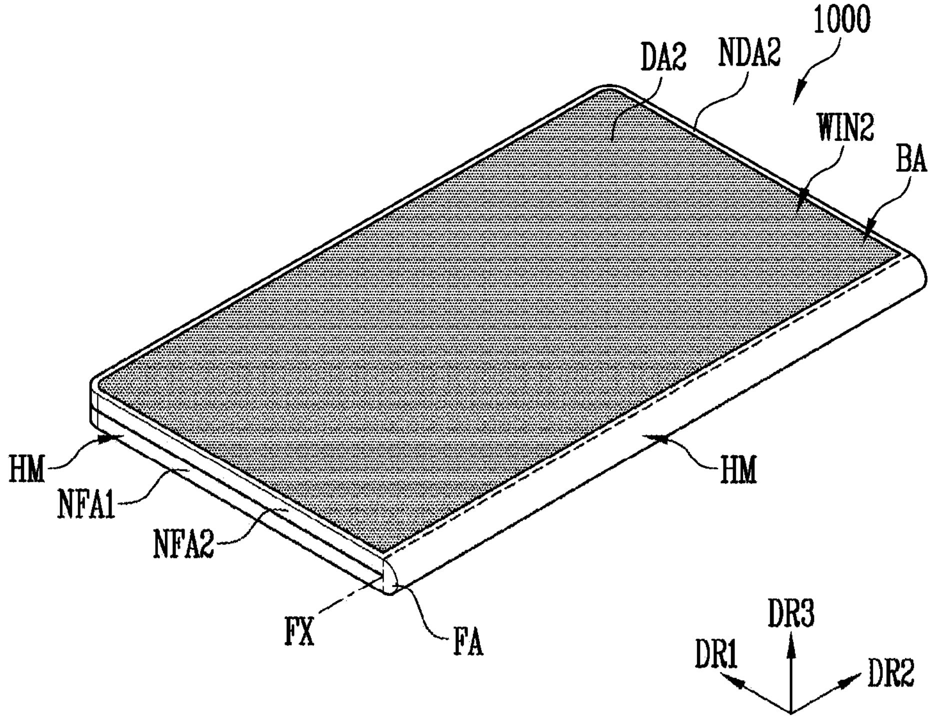
FIG. 2 illustrates an in-folding mode of the display device of FIG. 1.

FIG. 1 illustrates a normal mode of a display device according to embodiments of the present disclosure, and FIG. 2 illustrates an in-folding mode of the display device of FIG. 1.

Referring to FIGS. 1 and 2, a display device 1000 may be a foldable display device. In the present specification, "foldable" refers to any flexible state, including, for example, bendable, rollable, or similar. Furthermore, "foldable" encompasses various forms, such as partially or fully foldable, as well as folding inward or outward.

The display device 1000 may include an in-foldable display device and/or an out-foldable display device. That is, the display device 1000 may be a display device that may be used in an in-folding mode and/or an out-folding mode. Here, the in-folding mode refers to a form in which front surfaces FFA of the display device 1000 are folded to face each other (see FIG. 2). In addition, the out-folding mode refers to a mode in which back surfaces BA of the display device 1000 are folded to face each other.

Hereinafter, for convenience of description, it is assumed that the display device 1000 has a normal mode (see FIG. 1) that is not folded and an in-folding mode (see FIG. 2).

The display device 1000 includes first and second cover windows WIN1 and WIN2 and a housing HM, and a display panel 100 (see FIG. 3) may be disposed inside the first and second cover windows WIN1 and WIN2 and the housing HM. Accordingly, the first and second cover windows WIN1 and WIN2 and the housing HM may be combined to form an appearance of the display device 1000.

The first and second cover windows WIN1 and WIN2 may include an insulating panel. For example, the first and second cover windows WIN1 and WIN2 may be made of glass, plastic, or a combination thereof. In an embodiment, the first and second cover windows WIN1 and WIN2 may include a touch sensing portion capable of sensing a touch.

The first cover window WIN1 may be disposed in a first display area DA1 in which an image is displayed and a first non-display area NDA1 in which an image is not displayed. The second cover window WIN2 may be disposed in a second display area DA2 in which an image is displayed and a second non-display area NDA2 in which an image is not displayed.

A front surface of the first cover window WIN1 may define the front surface FFA of the display device 1000. A front surface of the second cover window WIN2 and a portion of the housing HM may define the back surface BA of the display device 1000.

The housing HM may be coupled to the first and second cover windows WIN1 and WIN2. The housing HM may be coupled to the first and second cover windows WIN1 and WIN2 to provide a predetermined accommodation space. The display device 1000 may be accommodated in a predetermined accommodation space provided between the housing HM and the first and second cover windows WIN1 and WIN2.

The housing HM may include a material with relatively high rigidity. For example, the housing HM may include a plurality of frames and/or plates made of glass, plastic, or metal, or a combination thereof. The housing HM may stably protect components of the display device 1000 accommodated in an inner space formed by the housing HM and the first and second cover windows WIN1 and WIN2 from external impact.

The display device 1000 may display an image through the display areas DA1 and DA2. Various display devices such as, for example, a light-emitting diode (LED) display device, an organic light-emitting diode (OLED) display device, and a quantum dot light emitting display device may be used as the display device 1000.

The shape of the display device 1000 may be variously modified. For example, the display device 1000 may have shapes such as a rectangular shape with a long horizontal length, a rectangular shape with a long vertical length, a square, a quadrangular shape with a rounded corner (edge), other polygonal shapes, and a circular shape. The shapes of the display areas DA1 and DA2 of the display device 1000 may be similar to the overall shape of the display device 1000.

The display device 1000 may include the display areas DA1 and DA2 and the non-display areas NDA1 and NDA2. The display areas DA1 and DA2 are areas in which images are displayed, and the non-display areas NDA1 and NDA2 are areas in which images are not displayed. The first display area DA1 occupies most of the front surface of the display device 1000, and the first non-display area NDA1 may have a structure surrounding the periphery of the first display area DA1. The second display area DA2 occupies a partial area of the back surface BA of the display device 1000, and the second non-display area NDA2 may have a structure surrounding the periphery of the second display area DA2.

In an embodiment, components such as, for example, sensors or cameras that add various functions to the display device 1000, may be disposed in a partial area of the first display area DA1 or a partial area of the second display area DA2. In an embodiment, the components may be disposed on the housing HM of the back surface BA of the display device 1000.

The display device 1000 may include a first non-folding area NFA1, a second non-folding area NFA2, and a folding area FA disposed between the first non-folding area NFA1 and the second non-folding area NFA2.

The first display area DA1 is not folded in a normal mode of the display device 1000. For example, in the normal mode, the first display area DA1 may display an image in the third direction DR3, and the second display area DA2 may display an image in a direction opposite to the third direction DR3.

The first portion of the first display area DA1 (for example, an area within the first non-folding area NFA1) and the second portion of the first display area DA1 (for example, an area within the second non-folding area NFA2) may be folded to directly face each other in the in-folding mode. For example, the first portion of the first display area DA1 and the second portion of the first display area DA1 may be folded based on a folding axis FX in the in-folding mode. For example, in the in-folding mode of the display device 1000, the first display area DA1 does not display an image, and the second display area DA2 may display an image in the third direction DR3. Here, the first portion of the first non-display area NDA1 and the second portion different from the first portion may also be folded to face each other in the in-folding mode.

In an embodiment, the second display area DA2 may be smaller than the first display area DA1. For example, a resolution of the first display area DA1 may be higher than that of the second display area DA2. For example, a length of the second display area DA2 in the first direction DR1 may be shorter than that of the first display area DA1 in the first direction DR1, and a length of the second display area DA2 in the second direction DR2, which crosses (e.g., is perpendicular to) the first direction DR1, may be the same as that of the first display area DA1 in the second direction DR2. However, the present disclosure is not limited to the shapes of the first display area DA1 and the second display area DA2 described above.

Figure 3:
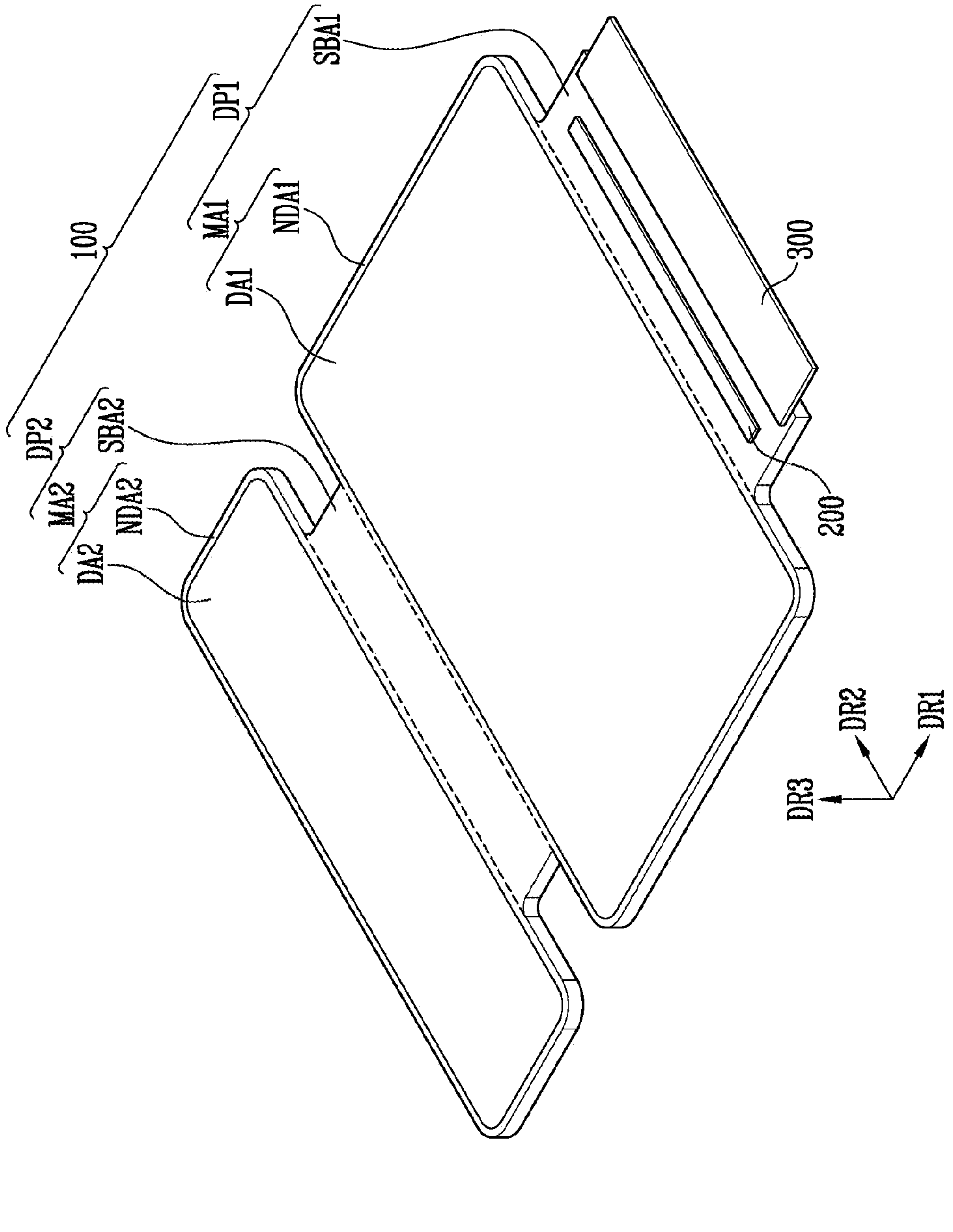
FIG. 3 illustrates a perspective view of a display panel of the display device of FIG. 1.
Figure 4:
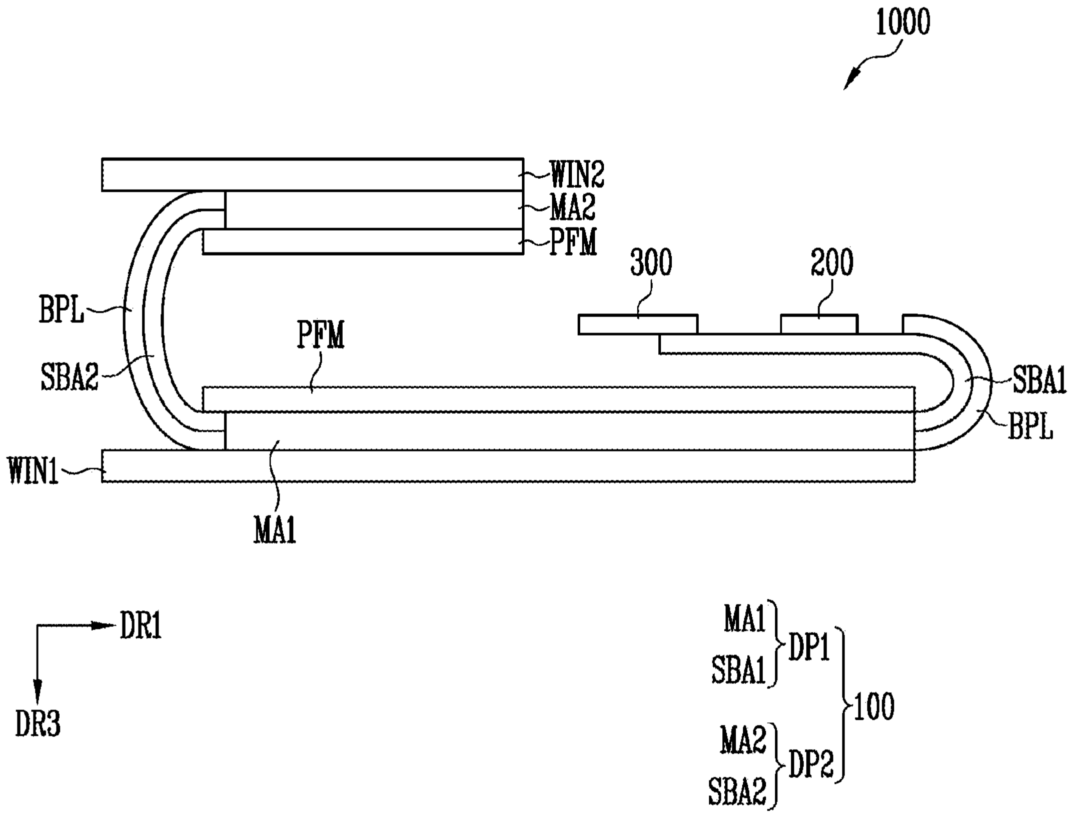
FIG. 4 illustrates a cross-sectional view of a display panel of the display device of FIG. 1.

FIG. 3 illustrates a perspective view of a display panel of the display device of FIG. 1, and FIG. 4 illustrates a cross-sectional view of a display panel of the display device of FIG. 1.

FIG. 3 illustrates a display panel 100 before first and second sub-areas SBA1 and SBA2 are bent, and FIG. 4 illustrates the display panel 100 after the first and second sub-areas SBA1 and SBA2 are bent.

The display panel 100 may be disposed inside the first and second cover windows WIN1 and WIN2 and the housing HM (see FIG. 1) in the form of FIG. 4.

For convenience of description, in FIG. 4, components other than the display panel 100, a driving chip 200, a circuit board 300, the first and second cover windows WIN1 and WIN2, a protective film PFM, and a bending protective layer BPL are omitted.

Referring to FIGS. 1 to 3, the display device 1000 may include the display panel 100, the driving chip 200, and the circuit board 300.

The display panel 100 may include a first display panel DP1 and a second display panel DP2. The first display panel DP1 may include a first main area MA1 and a first sub-area SBA1. The second display panel DP2 may include a second main area MA2 and a second sub-area SBA2.

The first main area MA1 may include a first display area DA1 including pixels that display an image, and a first non-display area NDA1 not including pixels disposed around the first display area DA1.

The first display area DA1 may emit light in the third direction DR3 (see FIG. 1) in the normal mode (see FIG. 1). For example, the first display area DA1 may include a pixel circuit portion including a transistor, and a pixel defining film including a light emitting element and having an opening defining a light emitting area of the light emitting element. Here, the light emitting element may include at least one of, for example, an organic light emitting diode including an organic light emitting layer, a quantum dot LED including a quantum dot light emitting layer, an inorganic LED including an inorganic semiconductor, and a micro LED, but is not limited thereto.

The first non-display area NDA1 is an area outside the first display area DA1 and surrounding the first display area DA1. The first non-display area NDA1 may be defined as an edge area of the first display area DA1. The first non-display area NDA1 may include a first gate driver 410 (see FIG. 5) that supplies gate signals to first gate lines GL1 (see FIG. 5).

The first sub-area SBA1 may be an area extending from one side of the first main area MA1. The first sub-area SBA1 may include a flexible material capable of bending, folding, rolling, and the like. For example, when the first sub-area SBA1 is bent, the first sub-area SBA1 may overlap the first main area MA1 in a thickness direction (for example, the third direction DR3) (see FIG. 4). The first sub-area SBA1 may include a pad portion connected to the driving chip 200 and the circuit board 300.

The second main area MA2 may include a second display area DA2 including pixels that display an image, and a second non-display area NDA2 not including pixels disposed around the second display area DA2.

The second display area DA2 may emit light in a direction opposite to the third direction DR3 (see FIG. 1) in the normal mode (see FIG. 1). The configuration of the second display area DA2 is substantially the same as that of the first display area DA1, and thus, for convenience of explanation, redundant descriptions will be omitted.

The second non-display area NDA2 is an area outside the second display area DA2 and surrounding the second display area DA2. The second non-display area NDA2 may be defined as an edge area of the second display area DA2. The second non-display area NDA2 may include a second gate driver 420 (see FIG. 5) that supplies gate signals to second gate lines GL2 (see FIG. 5).

The second sub-area SBA2 may be an area extending from one side of the second main area MA2. The second sub-area SBA2 may include a flexible material capable of bending, folding, rolling, and the like. For example, when the second sub-area SBA2 is bent, the second sub-area SBA2 may overlap the first main area MA1 in a thickness direction (for example, the third direction DR3 (see FIG. 4)). A data line DL (see FIG. 5), which is included among a plurality of data lines, and gate control lines GCL1 and GCL2 (see FIG. 5), which are included among a plurality of gate control lines, may be disposed in the second sub-area SBA2. The data line DL (see FIG. 5) and the gate control lines GCL1 and GCL2 (see FIG. 5) are disposed in the second sub-area SBA2, so that the driving chip 200 may display an image on the second display panel DP2.

The driving chip 200 may output signals and voltages that drive the display panel 100. The driving chip 200 may supply data voltages to the data lines DL (see FIG. 5). The driving chip 200 may supply a power voltage to the power line, and may supply a gate control signal to the gate drivers 410 and 420 (see FIG. 5) and the gate control lines GCL1 and GCL2 (see FIG. 5). The driving chip 200 may be formed as an integrated circuit (IC) and mounted on the display panel 100 by, for example, a chip on glass (COG) method, a chip on plastic (COP) method, or an ultrasonic bonding method. In an embodiment, the driving chip 200 may be disposed in the first sub-area SBA1. In an embodiment, the driving chip 200 may be mounted on the circuit board 300.

The circuit board 300 may be attached to the pad portion of the display panel 100 using, for example, an anisotropic conductive film (ACF). Lead lines of the circuit board 300 may be electrically connected to the pad portion of the display panel 100. The circuit board 300 may be, for example, a flexible printed circuit board, a printed circuit board, or a flexible film such as a chip-on-film.

Referring to FIG. 4, the display device 1000 may include the display panel 100, the driving chip 200, the circuit board 300, the first and second cover windows WIN1 and WIN2, the protective film PFM, and the bending protection layer BPL.

The first sub-area SBA1 and the second sub-area SBA2 may be bent. For example, as shown in FIG. 4, the first sub-area SBA1 may be bent to face the first main area MA1, and the second sub-area SBA2 may be bent so that the second main area MA2 faces the first main area MA1.

The bending protective layer BPL may be disposed on the first sub-area SBA1 and the second sub-area SBA2. The bending protective layer BPL may cover a portion of the first sub-area SBA1 and may cover the second sub-area SBA2. The bending protective layer BPL may protect the first sub-area SBA1 and the second sub-area SBA2. For example, the bending protective layer BPL may protect the conductive layer in the first sub-area SBA1 and the second sub-area SBA2. The gate control lines GCL1 and GCL2 (see FIG. 5) and the data line DL may be disposed on the conductive layer. The bending protective layer BPL may reduce tensile stress applied to the conductive layer. In addition, the bending protective layer BPL may protect the first sub-area SBA1 and the second sub-area SBA2 from static electricity introduced from outside of the display device 1000.

In an embodiment, a polarizing layer may be disposed between the cover windows WIN1 and WIN2 and the main areas MA1 and MA2. The polarizing layer may reduce external light reflection of the display device 1000.

In an embodiment, in the display device 1000, an adhesive layer may be disposed between the protective film PFM and the main areas MA1 and MA2.

In an embodiment, the display device 1000 may include a cushion layer adjacent to a portion of the protective film PFM. For example, the display device 1000 may include a cushion layer adjacent to the protective film PFM adjacent to the second main area MA2 in the third direction DR3. For example, the display device 1000 may include a cushion layer adjacent to the protective film PFM adjacent to the first main area MA2 in a direction opposite to the third direction DR3.

Figure 5:
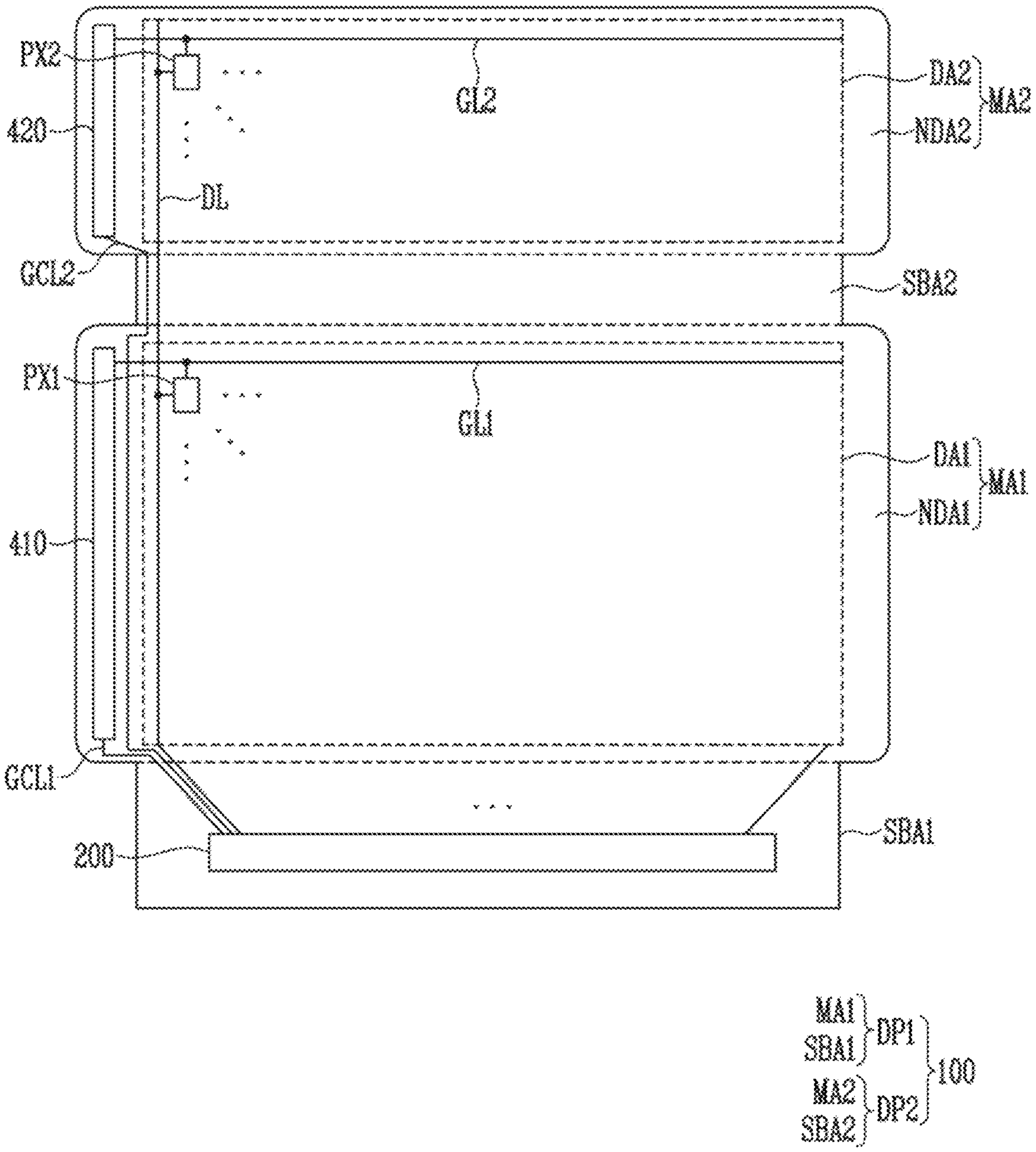
FIG. 5 illustrates a schematic plan view of a connection relationship between components of the display panel and driving chip of FIG. 3.

FIG. 5 illustrates a schematic plan view of a connection relationship between components of the display panel and driving chip of FIG. 3.

Referring to FIG. 5, pixels PX1 and PX2, which are included among a plurality of pixels, the gate lines GL1 and GL2, which are included among a plurality of gate lines, and the data line DL, which is included among a plurality of data lines, may be disposed in the display areas DA1 and DA2. Each of the pixels PX1 and PX2 is a minimum unit that emits light, and includes a pixel circuit portion including a transistor and a capacitor, and a light emitting element that receives a current from the pixel circuit portion.

The first display area DA1 may include the first pixel PX1. The first pixel PX1 may be connected to the first gate line GL1 and the data line DL. The second display area DA2 may include the second pixel PX2. The second pixel PX2 may be connected to the second gate line GL2 and the data line DL.

The display panel 100 may include the gate drivers 410 and 420. The gate drivers 410 and 420 may generate a gate signal based on the gate control signal and supply the gate signal to the gate lines GL1 and GL2.

In an embodiment, the first non-display area NDA1 may include the first gate driver 410. The first gate driver 410 may provide a gate signal to the first gate line GL1 connected to the first pixel PX1. In an embodiment, the second non-display area NDA2 may include the second gate driver 420. The second gate driver 420 may provide a gate signal to the second gate line GL2 connected to the second pixel PX2.

In an embodiment described herein, it is illustrated that the gate drivers 410 and 420 are disposed in the non-display areas NDA1 and NDA2. However, the present disclosure is not limited thereto. For example, in an embodiment, the gate drivers 410 and 420 may be disposed in the first sub-area SBA1 or the circuit board 300.

The driving chip 200 may provide a data voltage to the data line DL. The driving chip 200 may receive input image data IMG (see FIG. 6) and input control signals CONT (see FIG. 6) from a processor 2000 (see FIG. 6) (for example, a graphic processing unit (GPU) or the like). For example, the input image data IMG (see FIG. 6) may include red image data, green image data, and blue image data. In an embodiment, the input image data IMG (see FIG. 6) may further include white image data. In an embodiment, the input image data IMG may include magenta image data, yellow image data, and cyan image data.

Figure 6:
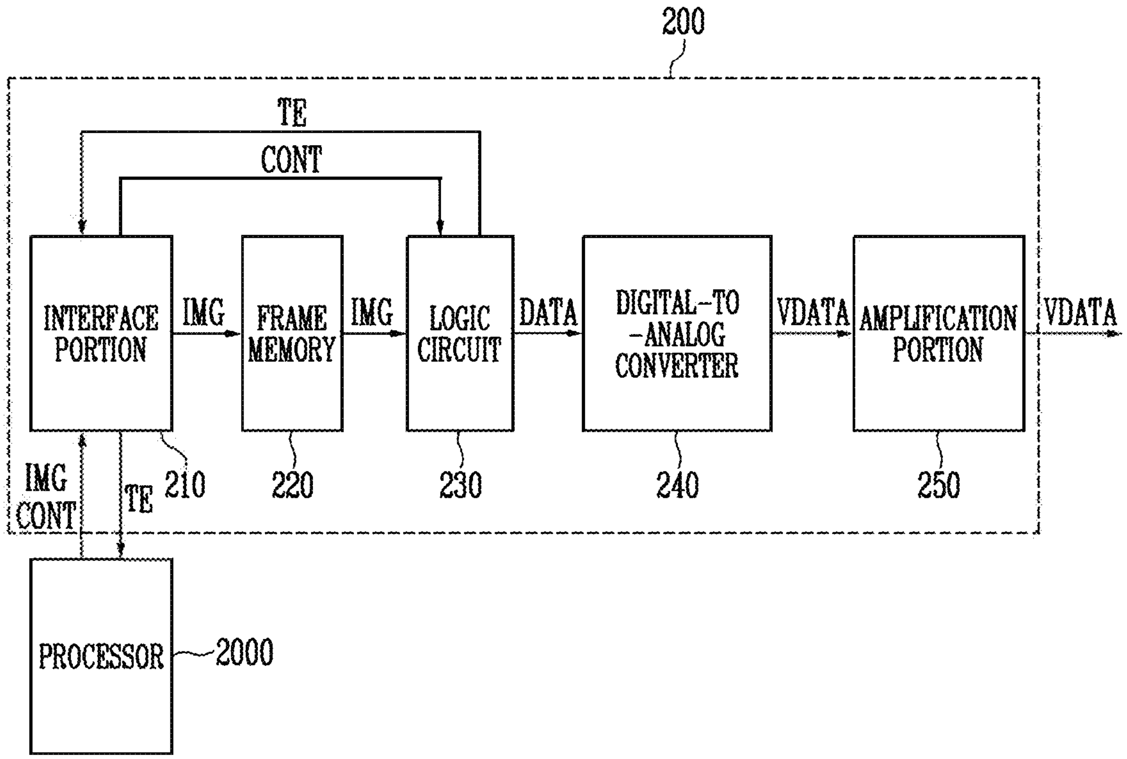
FIG. 6 illustrates a block diagram of an example of the driving chip of FIG. 5.

The driving chip 200 may generate a gate control signal and a data voltage based on the input image data IMG (see FIG. 6) and the input control signal CONT (see FIG. 6).

The gate drivers 410 and 420 may generate a gate signal in response to the gate control signal. In addition, the gate drivers 410 and 420 may output the gate signal to the gate lines GL1 and GL2.

In an embodiment, the driving chip 200 may provide a gate control signal that controls the first gate driver 410 to the first gate control line GCL1 connected to the first gate driver 410, and provide a gate control signal that controls the second gate driver 420 to the second gate control line GCL2 connected to the second gate driver 420.

In an embodiment described herein, it is illustrated that the driving chip 200 provides the gate control signal to each of the first gate driver 410 and the second gate driver 420. However, the present disclosure is not limited thereto. For example, in an embodiment, the driving chip 200 may provide a gate control signal to the first gate driver 410, and the first gate driver 410 may provide a signal that controls the second gate driver 420 to the second gate driver 420. In this case, the second gate control line GCL2 may be connected between the first gate driver 410 and the second gate driver 420.

The driving chip 200 may be disposed in the first sub-area SBA1. In addition, wires (for example, the data line DL, the gate control lines GCL1 and GCL2, and the like) connected to the driving chip 200 may be disposed in the first sub-area SBA1. The data line DL and the second gate control line GCL2 may be disposed in the second sub-area SBA2.

In this way, since the first pixel PX1 and the second pixel PX2 are connected to the same data line DL, the first display panel DP1 and the second display panel DP2 may be driven by one driving chip 200. Accordingly, the number of required driving chips 200 may be reduced, and production cost, size, and power consumption of the display device 1000 (see FIG. 1) may be reduced.

FIG. 6 illustrates a block diagram of an example of the driving chip 200 of FIG. 5.

Referring to FIG. 6, the driving chip 200 may include an interface portion 210, a frame memory 220, a logic circuit 230, a digital-to-analog (DAC) converter 240, and an amplification portion 250. The components included on the driving chip 200 may form a driving circuit. Thus, the driving chip 200 may also be referred to as a driving circuit or a driving circuit chip.

The interface portion 210 may perform a function of communicating with the processor 2000 through a predetermined interface, and may receive various signals from the processor 2000. For example, the interface may include at least one of a mobile industry processor interface (MIPI) and a serial peripheral interface bus (SPI).

The frame memory 220 may store the input image data IMG of one frame. For example, the frame memory 220 may serve as a frame buffer.

The capacity of the frame memory 220 may have a value corresponding to one of the resolution of the first display panel DP1 and the resolution of the second display panel DP2. The driving chip 200 may output a data voltage VDATA for the first display panel DP1 or a data voltage VDATA for the second display panel DP2 in one frame. Accordingly, the capacity of the frame memory 220 may have a value corresponding to a higher resolution among the resolution of the first display panel DP1 and the resolution of the second display panel DP2.

For example, as shown in FIG. 5, when the resolution of the first display panel DP1 is higher than the resolution of the second display panel DP2, the capacity of the frame memory 220 may have a value corresponding to the resolution of the first display panel DP1. Here, the value corresponding to the resolution means the value of the input image data IMG for the image of one frame displayed at the resolution.

The logic circuit 230 may perform various operations performed by the driving chip 200. For example, the logic circuit 230 may load input image data from the frame memory 220 and generate a data signal DATA based on the input image data IMG and the input control signal CONT.

The logic circuit 230 may generate a timing control signal TE. The timing control signal TE may be provided to the processor 2000 through the interface portion 210. The processor 2000 may control the transmission timing of the input image data IMG based on the input timing control signal TE. The timing control signal TE is a control signal that may prevent tearing.

The logic circuit 230 may generate a vertical synchronization signal VSYNC (see FIG. 8) that defines one frame, which is described further below.

In an embodiment, the logic circuit 230 may include an oscillator. The logic circuit 230 may drive the display panel 100 (see FIG. 5) at a specific driving frequency through the frequency source generated by the oscillator.

The digital-to-analog converter 240 may convert a data signal DATA, which is a digital signal, into a digital voltage VDATA, which is an analog signal. The amplification portion 250 may amplify the digital voltage VDATA and provide the amplified digital voltage VDATA to the data line DL. For example, the amplification portion 250 may include an amplifier.

Figure 8:
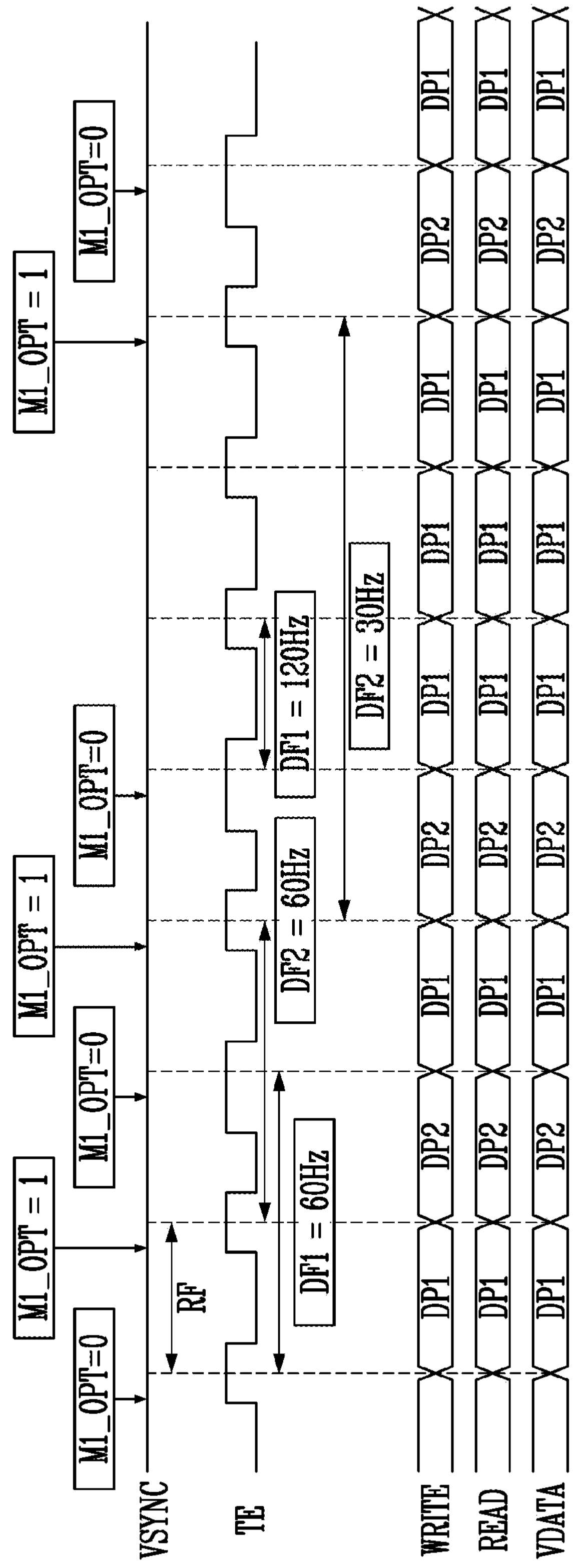
FIG. 8 illustrates a timing diagram related to an example in which the display device of FIG. 1 is driven in a first mode.
Figure 9:
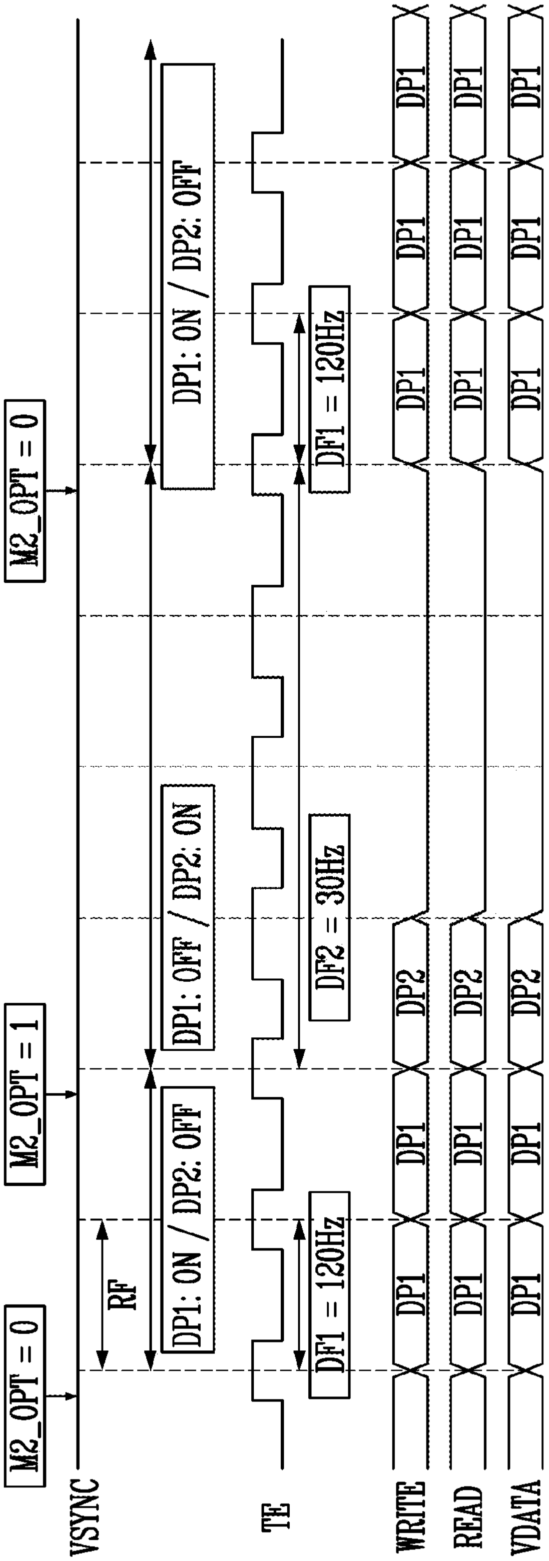
FIG. 9 illustrates a timing diagram related to an example in which the display device of FIG. 1 is driven in a second mode.

FIG. 7 illustrates a table related to an example in which the display device of FIG. 1 drives a display panel, FIG. 8 illustrates a timing diagram related to an example in which the display device of FIG. 1 is driven in a first mode, and FIG. 9 illustrates a timing diagram related to an example in which the display device of FIG. 1 is driven in a second mode.

Referring to FIGS. 5 to 7, the driving chip 200 may simultaneously display (that is, simultaneously drive) an image on the first display panel DP1 and the second display panel DP2 in a first mode M1, and display (that is, individually drive) an image on one of the first display panel DP1 and the second display panel DP2 (e.g., on only one of the first display panel DP1 and the second display panel DP2) in a second mode M2.

The driving mode of the driving chip 200 may be determined by the processor 2000. In an embodiment, the driving chip 200 may generate a mode signal MS having a value of 0 or 1 based on the input control signal CONT. When the mode signal MS has a value of 0, the driving chip 200 may operate in the first mode M1. When the mode signal MS has a value of 1, the driving chip 200 may operate in the second mode M2.

In an embodiment, the driving chip 200 may receive the mode signal MS from the processor 2000 and may be driven in the first mode M1 or the second mode M2 according to the mode signal MS.

The vertical synchronization signal VSYNC may define one frame. For example, the vertical synchronization signal VSYNC may indicate the start of the frame. The mode signal MS having a value of 0 or 1 is generated before the start of each frame, and the driving chip 200 may determine the driving mode of each frame based on the generated mode signal MS.

The driving chip 200 may selectively refresh one of the first display panel DP1 and the second display panel DP2. For example, the driving chip 200 may provide the data voltage VDATA for one of the first display panel DP1 and the second display panel DP2 to the data line DL in one frame. That is, a frame in which the first display panel DP1 is refreshed and a frame in which the second display panel DP2 is refreshed may be different from each other.

Referring to FIGS. 5 to 8, in the first mode M1, the driving chip 200 may refresh the first display panel DP1 at a first driving frequency DF1, and refresh the second display panel DP2 at a second driving frequency DF2, which may be different from the first driving frequency DF1.

In the first mode M1, the driving chip 200 may generate a first mode option signal M1_OPT. When the first mode option signal M1_OPT has a value of 0, the driving chip 200 may refresh the first display panel DP1 by applying the data voltage VDATA for the first display panel DP1 to the data line DL. When the first mode option signal M1_OPT has a value of 1, the driving chip 200 may refresh the second display panel DP2 by applying the data voltage VDATA for the second display panel DP2 to the data line DL. The value of the first mode option signal M1_OPT may be determined by the processor 2000. For example, the driving chip 200 may generate a first mode option signal M1_OPT having a value of 0 or 1 based on the input control signal CONT.

For example, when the first mode option signal M1_OPT has a value of 0, the driving chip 200 may receive the input image data IMG for the first display panel DP1 from the processor 2000 and store the input image data IMG for the first display panel DP1 in the frame memory 220 (that is, perform a write operation WRITE). In addition, the logic circuit 230 may load the input image data IMG for the first display panel DP1 (that is, perform a read operation READ), and generate the data signal DATA for the first display panel DP1 based on the input image data IMG for the first display panel DP1. The digital-to-analog converter 240 may convert the data signal DATA into a data voltage VDATA. Accordingly, the driving chip 200 may refresh the first display panel DP1.

For example, when the first mode option signal M1_OPT has a value of 1, the driving chip 200 may receive the input image data IMG for the second display panel DP2 from the processor 2000 and store the input image data IMG for the second display panel DP2 in the frame memory 220 (that is, perform a write operation WRITE). In addition, the logic circuit 230 may load the input image data IMG for the second display panel DP2 (that is, perform a read operation READ), and generate the data signal DATA for the second display panel DP2 based on the input image data IMG for the second display panel DP2. The digital-to-analog converter 240 may convert the data signal DATA into a data voltage VDATA. Accordingly, the driving chip 200 may refresh the second display panel DP2.

The first display panel DP1 and the second display panel DP2 may display an image of the previous frame in a frame that is not refreshed. For example, in a frame in which the first display panel DP1 is refreshed, the second display panel DP2 may display an image of the previous frame. For example, in a frame in which the second display panel DP2 is refreshed, the first display panel DP1 may display an image of the previous frame.

For example, when the driving frequencies DF1 and DF2 are about 120 Hz, it is assumed that the display panels DP1 and DP2 are refreshed in each reference frame RF. When the first driving frequency DF1 is about 60 Hz and the second driving frequency DF2 is about 60 Hz, the first display panel DP1 and the second display panel DP2 may be alternately refreshed. When the first driving frequency DF1 is about 120 Hz and the second driving frequency DF2 is about 30 Hz, after the second display panel DP2 is refreshed, the first display panel DP1 may be refreshed during three frames.

The timing control signal TE may be transmitted to the processor 2000 for each reference frame RF. When the resolution of the second display panel DP2 is lower than the resolution of the first display panel DP1, the time taken to refresh the second display panel DP2 may be shorter than the time taken to refresh the first display panel DP1. Accordingly, the timing control signal TE may rise relatively faster in a frame in which the second display panel DP2 is refreshed than in a frame in which the first display panel DP1 is refreshed.

Referring to FIGS. 5 to 7 and 9, in the second mode M2, the driving chip 200 may display an image on the first display panel DP1 or on the second display panel DP2. Unlike the first mode M1, in the second mode M2, only the first display panel DP1 may display an image, or only the second display panel DP2 may display an image.

In the second mode M2, the driving chip 200 may generate a second mode option signal M2_OPT. When the second mode option signal M2_OPT has a value of 0, the driving chip 200 may display an image only on the first display panel DP1, and apply the data voltage VDATA for the first display panel DP1 to the data line DL to refresh the first display panel DP1. When the second mode option signal M2_OPT has a value of 1, the driving chip 200 may display an image only on the second display panel DP2, and apply the data voltage VDATA for the second display panel DP2 to the data line DL to refresh the second display panel DP2. The value of the second mode option signal M2_OPT may be determined by the processor 2000. For example, the driving chip 200 may generate a second mode option signal M2_OPT having a value of 0 or 1 based on the input control signal CONT.

For example, when the second mode option signal M2_OPT has a value of 0, the driving chip 200 may receive the input image data IMG for the first display panel DP1 from the processor 2000 and store the input image data IMG for the first display panel DP1 in the frame memory 220 (that is, perform a write operation WRITE). In addition, the logic circuit 230 may load the input image data IMG for the first display panel DP1 (that is, perform read operation READ), and generate the data signal DATA for the first display panel DP1 based on the input image data IMG for the first display panel DP1. The digital-to-analog converter 240 may convert the data signal DATA into a data voltage VDATA. Accordingly, the driving chip 200 may refresh the first display panel DP1.

For example, when the second mode option signal M2_OPT has a value of 1, the driving chip 200 may receive the input image data IMG for the second display panel DP2 from the processor 2000 and store the input image data IMG for the second display panel DP2 in the frame memory 220 (that is, perform write operation WRITE). In addition, the logic circuit 230 may load the input image data IMG for the second display panel DP2 (that is, perform read operation READ), and generate the data signal DATA for the second display panel DP2 based on the input image data IMG for the second display panel DP2. The digital-to-analog converter 240 may convert the data signal DATA into a data voltage VDATA. Accordingly, the driving chip 200 may refresh the second display panel DP2.

In the second mode M2, the length of one frame may be determined by the driving frequencies DF1 and DF2. For example, when the second mode option signal M2_OPT is 0, the length of one frame may be determined by the first driving frequency DF1. For example, when the second mode option signal M2_OPT is 1, the length of one frame may be determined by the second driving frequency DF2. For example, the length of one frame when the driving frequencies DF1 and DF2 are about 120 Hz may be shorter than the length of one frame when the driving frequencies DF1 and DF2 are about 30 Hz.

The timing control signal TE may be transmitted to the processor 2000 for each reference frame RF. When the resolution of the second display panel DP2 is lower than the resolution of the first display panel DP1, the time taken to refresh the second display panel DP2 may be shorter than the time taken to refresh the first display panel DP1. Accordingly, the timing control signal TE may rise relatively faster in a frame in which the second display panel DP2 is refreshed than in a frame in which the first display panel DP1 is refreshed.

Figure 10:
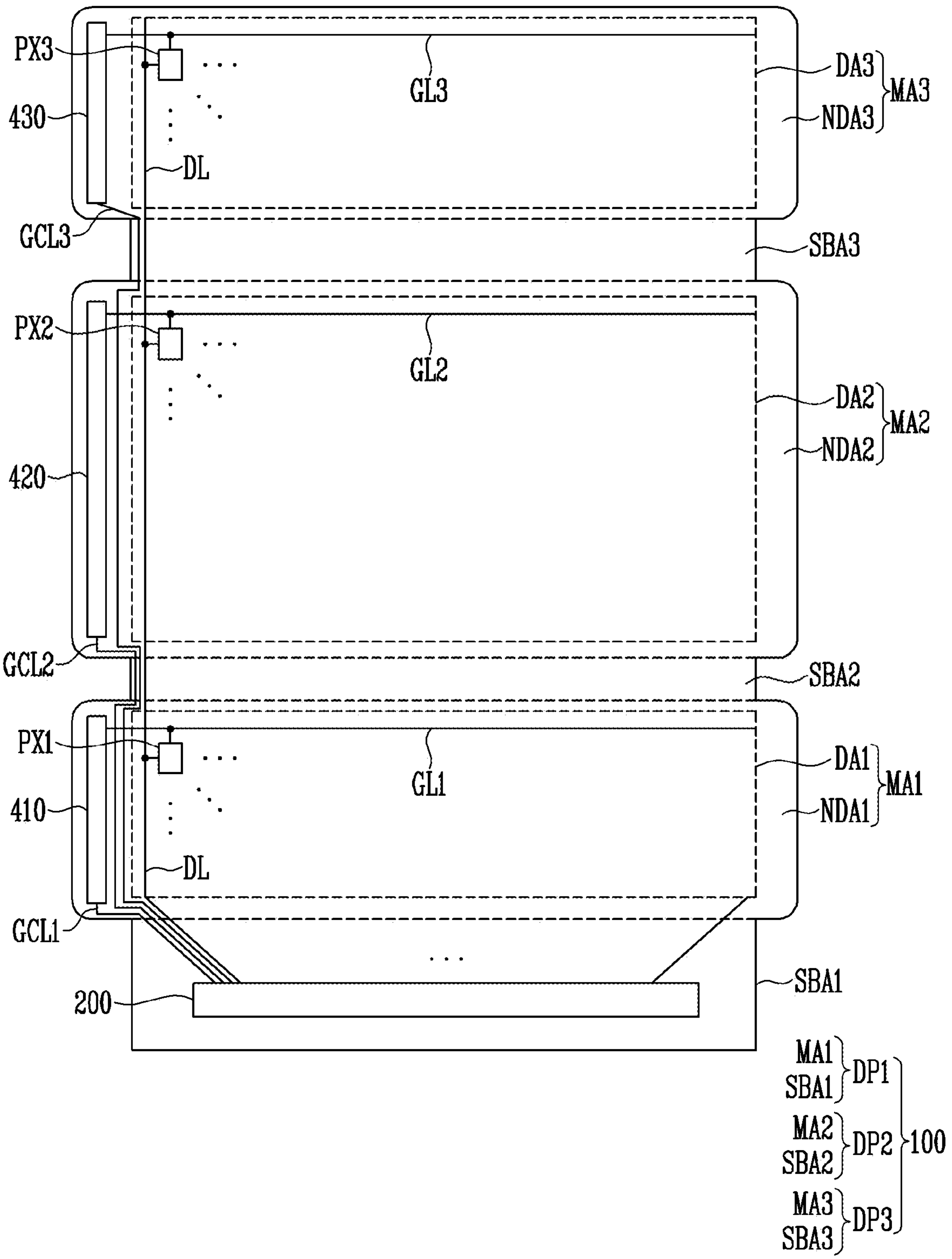
FIG. 10 illustrates a schematic plan view of a connection relationship between components of a display panel and a driving chip of a display device according to embodiments of the present disclosure.

FIG. 10 illustrates a schematic plan view of a connection relationship between components of a display panel and a driving chip of a display device according to embodiments of the present disclosure.

Since the display device according to embodiments described herein is substantially the same as the configuration of the display device of FIG. 1 except for the number of display panels DP1, DP2, and DP3, the same reference numbers and reference symbols are used for the same or similar components, and redundant descriptions thereof are omitted.

Referring to FIG. 10, pixels PX1, PX2, and PX3, which are included among a plurality of pixels, gate lines GL1, GL2, and GL3, which are included among a plurality of gate lines, and a data line DL, which is included among a plurality of data lines, may be disposed in the display areas DA1, DA2, and DA3. Each of the pixels PX1, PX2, and PX3 is a minimum unit that emits light, and includes a pixel circuit portion including a transistor and a capacitor, and a light emitting element that receives a current from the pixel circuit portion.

The first display area DA1 may include the first pixel PX1. The first pixel PX1 may be connected to the first gate line GL1 and the data line DL. The second display area DA2 may include the second pixel PX2. The second pixel PX2 may be connected to the second gate line GL2 and the data line DL. The third display area DA3 may include the third pixel PX2. The third pixel PX3 may be connected to the third gate line GL3 and the data line DL.

The display panel 100 may include the gate drivers 410, 420, and 430. The gate drivers 410, 420, and 430 may generate a gate signal based on the gate control signal and supply the gate signal to the gate lines GL1, GL2, and GL3.

In an embodiment, the first non-display area NDA1 may include the first gate driver 410. The first gate driver 410 may provide a gate signal to the first gate line GL1 connected to the first pixel PX1. In an embodiment, the second non-display area NDA2 may include the second gate driver 420. The second gate driver 420 may provide a gate signal to the second gate line GL2 connected to the second pixel PX2. In an embodiment, the third non-display area NDA3 may include the third gate driver 430. The third gate driver 430 may provide a gate signal to the third gate line GL3 connected to the third pixel PX3.

In an embodiment described herein, it is illustrated that the gate drivers 410, 420, and 430 are disposed in the non-display areas NDA1, NDA2, and NDA3. However, the present disclosure is not limited thereto. For example, in an embodiment, the gate drivers 410, 420, and 430 may be disposed in the first sub-area SBA1 or the circuit board 300.

The gate drivers 410, 420, and 430 may generate a gate signal in response to the gate control signal. In addition, the gate drivers 410, 420, and 430 may output the gate signal to the gate lines GL1, GL2, and GL3.

In an embodiment, the driving chip 200 may provide a gate control signal that controls the first gate driver 410 to the first gate control line GCL1 connected to the first gate driver 410, provide a gate control signal that controls the second gate driver 420 to the second gate control line GCL2 connected to the second gate driver 420, and provide a gate control signal that controls the third gate driver 430 to the third gate control line GCL3 connected to the third gate driver 430.

In an embodiment described herein, it is illustrated that the driving chip 200 provides the gate control signal to each of the first gate driver 410, the second gate driver 420, and the third gate driver 430. However, the present disclosure is not limited thereto. For example, in an embodiment, the driving chip 200 may provide a gate control signal to the first gate driver 410, the first gate driver 410 may provide a signal that controls the second gate driver 420 to the second gate driver 420, and the second gate driver 420 may provide a signal that controls the third gate driver 430 to the third gate driver 430. In this case, the second gate control line GCL2 may be connected between the first gate driver 410 and the second gate driver 420, and the third gate control line GCL3 may be connected between the second gate driver 420 and the third gate driver 430.

The driving chip 200 may be disposed in the first sub-area SBA1. In addition, wires (for example, the data line DL, the gate control lines GCL1 and GCL2, and the like) connected to the driving chip 200 may be disposed in the first sub-area SBA1. The data line DL, the second gate control line GCL2, and the third gate control line GCL3 may be disposed in the second sub-area SBA2. The data line DL and the third gate control line GCL3 may be disposed in the third sub-area SBA3.

As such, the first pixel PX1, the second pixel PX2, and the third pixel PX3 are connected to the same data line DL, so that the first display panel DP1, the second display panel DP2, and the third display panel DP3 may be driven by one driving chip 200. Accordingly, the number of required driving chips 200 may be reduced, and production cost, size, and power consumption of the display device may be reduced.

The second display area DA2 may be folded like the first display area DA1 of FIG. 1 (see FIG. 2). The third display panel DP3 may be bent in substantially the same manner as the second display panel DP2 of FIG. 4, and the first display panel DP1 may be bent in substantially the same manner as the third display panel DP3.

As is traditional in the field of the present disclosure, embodiments are described, and illustrated in the drawings, in terms of functional blocks, units and/or modules. Those skilled in the art will appreciate that these blocks, units, and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

According to the display device according to an embodiments of the present disclosure, it is possible to reduce the number of required driving chips and reduce the production cost of the display device by driving the first display panel and the second display panel by one driving chip. In addition, the display device according to an embodiments of the present disclosure may have a reduced size and reduced power consumption.

However, the effects of the present disclosure are not limited to the above-described effects, and may be variously extended without departing from the spirit and scope of the present disclosure.

Embodiments of the present disclosure may be applied to a display device and an electronic device including the same. For example, embodiments of the present disclosure may be applied to a digital TV, a 3D TV, a mobile phone, a smartphone, a tablet computer, a VR device, a PC, a home electronic device, a laptop computer, a PDA, a PMP, a digital camera, a music player, a portable game console, a navigation, and the like.

While the present disclosure has been particularly shown and described with reference to embodiments thereof, it will be understood by those of ordinary skill in the art that various changes in form and detail may be made therein without departing from the spirit and scope of the present invention as defined by the following claims.

What is claimed is:

1. A display device, comprising:

a first display panel comprising a first pixel, wherein the first display panel is positioned to display a first image in a first direction;

a second display panel comprising a second pixel, wherein the second display panel is positioned to display a second image in a second direction different from the first direction; and a driving circuit configured to:

provide a data voltage to a data line connected to the first pixel and the second pixel, wherein the driving circuit includes a frame memory configured to store input image data for one of the first display panel and the second display panel, the frame memory having a capacity corresponding to at least a higher resolution of the first display panel and the second display panel.

2. The display device of claim 1, wherein the first display panel includes:

a main area that is configured to display the first image; and a sub-area in which the driving circuit is disposed.

3. The display device of claim 2, wherein a first portion of the main area and a second portion of the main area that is different from the first portion are configured to be folded and face each other during a mode in which the display device is folded.

4. The display device of claim 1, wherein the second display panel includes:

a main area that is configured to display the second image; and a sub-area connecting the main area and the first display panel, wherein the data line is disposed in the sub-area.

5. The display device of claim 4, wherein the sub-area is bendable.

6. The display device of claim 1, wherein a second display area of the second display panel, in which the second image is displayed, is smaller than a first display area of the first display panel, in which the first image is displayed.

7. The display device of claim 6, wherein a length of the second display area in a first direction is shorter than a length of the first display area in the first direction, and a length of the second display area in a second direction perpendicular to the first direction is about equal to a length of the first display area in the second direction.

8. The display device of claim 1, wherein the driving circuit is configured to:

simultaneously display the first image on the first display panel and the second image on the second display panel during a mode in which the display device is unfolded.

9. The display device of claim 8, wherein the driving circuit is configured to:

refresh the first display panel at a first driving frequency; and refresh the second display panel at a second driving frequency.

10. The display device of claim 8, wherein a frame in which the first display panel is refreshed and a frame in which the second display panel is refreshed are different.

11. The display device of claim 1, wherein the driving circuit is configured to display an image on one of the first display panel and the second display panel, during a mode in which the display device is folded.

12. The display device of claim 1, wherein the driving circuit is configured to:

simultaneously display the first image on the first display panel and the second image on the second display panel during a first mode in which the display device is unfolded; and displays an image on one of the first display panel and the second display panel during a second mode in which the display device is folded.

13. The display device of claim 1, wherein the driving circuit provides the data voltage for one of the first display panel and the second display panel to the data line in one frame.

14. The display device of claim 1, wherein a resolution of the first display panel is higher than a resolution of the second display panel.

15. The display device of claim 14, wherein the frame memory stores one frame of the input image data.

16. A display device, comprising:

a first display panel including a first pixel and a first sub-area;

a second display panel including a second pixel and a second sub-area;

a first gate driver that provides a first gate signal to a first gate line connected to the first pixel;

a second gate driver that provides a second gate signal to a second gate line connected to the second pixel;

a driving circuit that provides a data voltage to a data line connected to the first pixel and the second pixel and provides a gate control signal to a first gate control line connected to the first gate driver and to a second gate control line connected to the second gate driver; and a bending protective layer that is disposed on the first sub-area and the second sub-area, wherein the first sub-area and the second sub-area are bendable, wherein the data line and the second gate control line are disposed on both of the first sub-area and the second sub-area, wherein the first gate control line is disposed on the first sub-area, and wherein the bending protective layer is configured to protect the data line, the first gate control line, and the second gate control line.

17. The display device of claim 16, wherein the first display panel includes:

a main area that is configured to display an image; and a sub-area in which the driving circuit is disposed.

18. The display device of claim 16, wherein the second display panel includes:

a main area that is configured to display an image; and a sub-area connecting the main area and the first display panel, wherein the data line is disposed in the sub-area.

19. The display device of claim 16, wherein the driving circuit is configured to:

simultaneously display an image on the first display panel and the second display panel during a first mode; and display the image on one of the first display panel and the second display panel during a second mode.

20. An electronic device, comprising:

a first display panel including a first pixel and a first sub-area;

a second display panel including a second pixel and a second sub-area;

a first gate driver that provides a gate signal to a first gate line connected to the first pixel;

a second gate driver that provides the gate signal to a second gate line connected to the second pixel; and a driving circuit that provides a data voltage to a data line connected to the first pixel and the second pixel and provides a gate control signal to a first gate control line connected to the first gate driver and to a second gate control line connected to the second gate driver; and a bending protective layer that is disposed on the first sub-area and the second sub-area, wherein the first sub-area and the second sub-area are bendable, wherein the data line and the second gate control line are disposed on both of the first sub-area and the second sub-area, wherein the first gate control line is disposed on the first sub-area, and wherein the bending protective layer is configured to protect the data line, the first gate control line, and the second gate control line.

* * * * *